United States Patent [19]
Wilkens

[11] Patent Number: 6,101,932
[45] Date of Patent: Aug. 15, 2000

[54] CHANNEL BALE PRESS FOR AGRICULTURAL HARVEST CROP AND DEVICE AND METHOD FOR CONTROLLING OPERATION OF THE BALE PRESS

[75] Inventor: Dieter Wilkens, Wolfenbüttel-Ahlum, Germany

[73] Assignee: Welger GmbH, Wolfenbüttel, Germany

[21] Appl. No.: 09/186,509

[22] Filed: Nov. 4, 1998

[30] Foreign Application Priority Data

Nov. 5, 1997 [DE] Germany .............. 197 48 748

[51] Int. Cl.⁷ .............. B30B 15/26; B30B 9/30; A01F 15/04
[52] U.S. Cl. .............. 100/41; 100/43; 100/50; 100/192
[58] Field of Search .............. 100/35, 41, 43, 100/45, 50, 191, 192

[56] References Cited

U.S. PATENT DOCUMENTS

| | | | |
|---|---|---|---|
| 2,722,884 | 11/1955 | Seltzer | 100/43 |
| 2,890,646 | 6/1959 | Soteropulos | 100/43 |
| 3,179,040 | 4/1965 | Seltzer | 100/43 |
| 3,467,000 | 9/1969 | Seltzer | 100/43 |
| 4,148,254 | 4/1979 | Graber et al. | 100/43 |
| 4,166,414 | 9/1979 | Fleming | 100/43 |
| 4,168,659 | 9/1979 | Yatcilla et al. | 100/43 |
| 4,280,403 | 7/1981 | Alderson | 100/43 |
| 4,565,123 | 1/1986 | Sanders | 100/43 |
| 4,624,180 | 11/1986 | Strosser | 100/43 |
| 4,627,341 | 12/1986 | Sudbrack et al. | 100/43 |
| 5,123,338 | 6/1992 | Mathis | 100/43 |
| 5,226,356 | 7/1993 | Schrag et al. | 100/41 |

FOREIGN PATENT DOCUMENTS

| | | |
|---|---|---|
| 0235397 | 3/1986 | European Pat. Off. . |
| 0379230 | 9/1986 | European Pat. Off. . |
| 0389322 | 9/1990 | European Pat. Off. . |
| 930663 | 7/1955 | Germany . |

Primary Examiner—Stephen F. Gerrity
Attorney, Agent, or Firm—Brown & Wood, LLP

[57] ABSTRACT

A bale press for agricultural harvest crops including a pressure channel having at least a portion of one of its sides formed by a pivotal rail section, a hydraulic device for applying pressure to the rail section, a plunger displaceable in the pressure channel for compressing a harvest crop therein, and a control device for controlling operating of the bale press and including a load sensor for sensing loading of the plunger with the loading representing a first controlled variable, a pressure sensor for sensing pressure in the hydraulic device with the pressure representing a second controlled variable, and an operator unit for changing the pressure applied to the rail section upon deviation of at least one of the controlled variables from a predetermined set value.

10 Claims, 1 Drawing Sheet

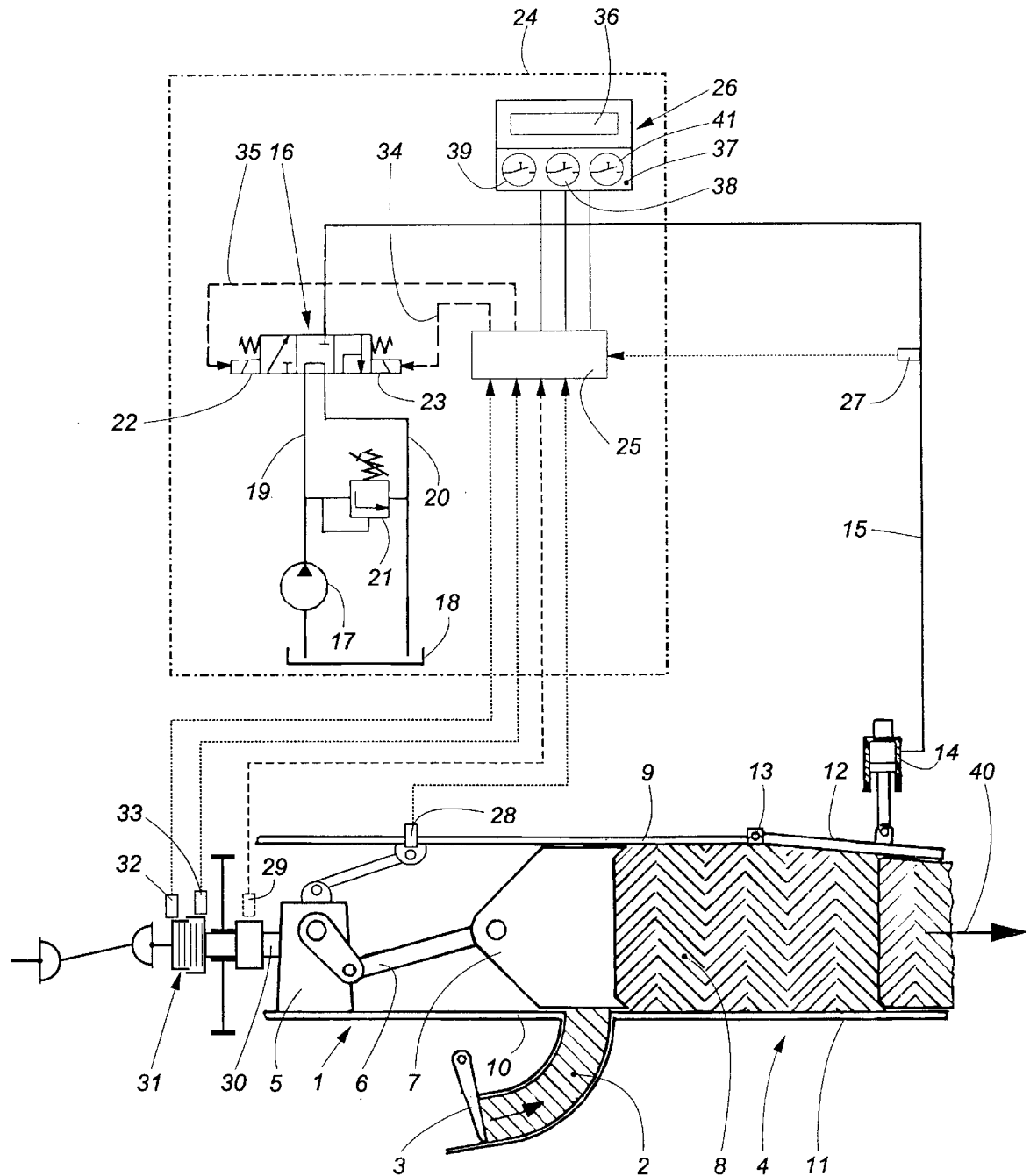

CHANNEL BALE PRESS FOR AGRICULTURAL HARVEST CROP AND DEVICE AND METHOD FOR CONTROLLING OPERATION OF THE BALE PRESS

BACKGROUND OF THE INVENTION

1. Field of the Invention

The present invention relates to a bale press for agricultural harvest crops including a pressure channel having at least a portion of one of its sides formed by a pivotal rail section, a hydraulic cylinder for applying pressure to the rail section, a plunger displaceable in the pressure channel for compressing a harvest crop therein, and a control device for controlling operation of the bale press and including a load sensor for sensing loading of the plunger and means for changing the pressure applied to the rail section upon deviation of the sensing signal from a predetermined set value.

2. Description of the Prior Art

As known, the control of the loading arrangement of the pressing channel of a channel bale press substantially influences the pressure density of bales. Ejected bound bales exert, due to their drag resistance, a counter pressure in the outlet, width-adjustable section of the pressing channel the magnitude and density of which correspond to the newly-formed bales. The greater is the drag resistance the greater is the compression density of the new bales. Moist product or crop has a relatively greater resistance than a dry product, and it is, therefore, compressed to a greater extent, whereas with the dry product, bales with a substantially smaller density are produced if the cross-sectional size of the pressing channel opening is not controlled, i.e., is not changed in accordance with the nature of the crop. Because the degree of dryness, e.g., of a pressed lay rapidly and continuously changes during the day, in order to form bales with a uniform compression density, it was proposed to automatically control the size of the pressing channel opening in accordance with the characteristics of the pressed crop. Thus, European Patent No. 389,322 discloses means for using the force applied by the plunger or the reaction force of the plunger for controlling pressure in the pressure conduit leading to the loading arrangement of the pressing channel which sometimes is called bale channel. The pressure is controlled in such a manner that the force applied by the plunger remains constant. However, the device disclosed in the above-mentioned European patent has a number of drawbacks.

Specifically, the degree of compression of bales of the same material and moisture content is substantially different when the bales are produced in bale presses with different throughputs. Because the bales are produced with a control designed to prevent that the set force value is exceeded, the pressure in the pressure conduit can be reduced though the counter pressure in the pressing channel has not increased, and the friction forces remain unchanged when the same material is processed. During the measurement of the reaction forces of the plunger exerted on an eccentric main drive, it was determined that larger packages of the same material give rise to pressure force peaks in crank positions with a larger operational lever arm, and the pressure is reduced relatively to a greater extent.

The force peaks, which are observed during cutting of packages with different moisture contents and/or having a greater size, and during each plunger stroke or during delivery of heaps, lead to an undesirably large pressure reduction.

Further, the set pressure value of the pressure exerted on the pressing channel loading device, which is preset on the pressure limiting valve, cannot be automatically changed dependent on the plunger force.

Therefore, the bales, which are produced with the above-described constant pressure force control, do not have the density which can be achieved by an optimal operation of a bale press. Thus, e.g., if during pressing of moist straw in the morning, an optimal pressure force is established, this force is not automatically adjusted for producing bales with a corresponding rigidity in the afternoon when a drier straw is being processed. Therefore, the required pressure force is set manually which is expensive and does not permit to set an optimal pressure force in accordance with the actual data, as the operator, for safety sake, set this force below the optimal value in order to prevent clogging.

In the known large channel bale press model D-6000 of the assignee herein, the application of pressure to the pressing channel loading device is effected with a hydraulic cylinder, with the control being effected by using a pressure sensor. The hydraulic pressure to the hydraulic cylinder is controlled by using a pressure limiting valve the operation of which is controlled by a constant pressure control device. The pressure in the pressure conduit is reduced when it exceeds a predetermined set pressure value, and is increased when the pressure in the pressure conduit is below a set value. This type of control permits to obtain a uniform constant hydraulic pressure when the press operates with an oscillating changing pressure force. Accordingly, the same relatively high compression densities of bales can be obtained as with the pressure force control. The drawback of this control consists in that the pressure sensors senses not the compression of the product in the pressing channel or the movement resistance in the pressure channel but rather the hydraulic pressure applied in the direction transverse to the extent of the pressuring channel, to the adjustable rail section of the pressing channel, which results in overcompression or undercompression of bales dependent on whether the hydraulic pressure is above or below the set value. That is, with this type of control, the plunger force increases e.g., upon the delivery of heaps of swath products. The hydraulic pressure is only then adjusted, i.e., the compression deviation is only then eliminated when it is sensed on the unbound ejected bales which, in an unfavorable case, can amount to a time lag of 20 seconds between the occurrence of the deviation and its measurement. In this bale press, a safety coupling is provided for preventing drive overloading.

An object of the present invention is to eliminate the drawbacks of the prior art bale press control systems.

Another object of the present invention is to provide a bale press with a control device which insures a better adaptation of the control to different material characteristics to produce bales with optimal characteristics with an optimal operation of the bale press.

A further object of the present invention is to provide a bale press which would permit to produce bales with a maximal pressure density without overloading of the press.

SUMMARY OF THE INVENTION

These and other objects of the present invention, which will become apparent hereinafter, are achieved by providing a bale press with a control device including a load sensor for sensing loading of the plunger, with the loading representing a first controlled variable, a pressure sensor for sensing pressure in the hydraulic means, with the pressure representing a second controlled variable, and means for changing the pressure applied to the rail section upon deviation of at least one of the two controlled variables from its predetermined set value.

The advantage of the present invention consists in that it permits to use, dependent on material characteristics and the press throughput, one or the other controlled variable for controlling the pressure applied to the channel loading device, the rail section, thereby permitting to use the advantages of the channel bale press. A particular advantage of the present invention consists in that it permits to control the operation of the loading device dependant on both controlled variables, with the influence of each controlled variable being determined by the proportioning element. Dry products are more elastic than moist products. Therefore, when dry products are compressed, ununiform swaths, heaps and large packages, which are developed at high throughputs of the bale presses, result in a smaller overloading of the press, as they apply a smaller pressure on the rigid wall of the pressing channel than moist products. Therefore, the dry products are compressed under a control in which the constant pressure regulation dominates the constant pressure force regulation, whereas during the compression of the moist products, the proportional regulation is based primarily on the constant pressure force regulation. This is because the pressing channel loading device reacts relatively rapidly on the pressure force peaks with a corresponding pressure reduction, whereas with the proportional regulation, the constant pressure force control overrides the constant pressure control in accordance with the proportion ratio. When an erroneous product delivery takes place, the constant pressure control is automatically turned off so that no increased pressure acts on the pressing channel loading device because of the reduction of the pressure force. When the pressure force again reaches the predetermined value, an automatic switching to the previously acting control takes place. Basically, the proportional control in accordance with a constant loading of the plunger and the constant pressure, averages the force applied to the pressing channel loading device because with a proportional control, neither the predetermined set pressure force value nor the predetermined set pressure value can be fully adjusted and, therefore, intermediate values are regulated. When the proportional regulation or control is effected based on the constant loading of the plunger, greater pressure oscillations take place. If the constant pressure control dominates, it is the pressure force which varies to a greater extent.

According to a further development of the present invention, it is contemplated to input the set values of the controlled variable, type of control, and the proportion ratio into an operator unit, and to display both the set values and the actual values to the press operator. In accordance with the pressed crop or product characteristics, the set pressure value is set forth and the proportioning element is set on null, i.e., a constant pressure control is established. Then, a reading of the actual pressure force value is taken, which reading is used as a preset value when the reading lies in an optimal region, or a desired maximum preset value is set on. Then, when necessary, the proportioning element is set to insure an optimal automatic adaptation of the pressure in the pressure conduit leading to the hydraulic cylinder of the pressing channel loading device dependent on the proportion signal.

In order to prevent overloading of the drive elements, independent of the predetermined pressure force and pressure values, advantageously, a torque limiting coupling is provided between input and output shafts. The control system includes a sensor for sensing slippage of the torque limiting coupling with the slippage signal being used as a controlled variable, which overrides all other controlled variables when the predetermined slippage value is exceeded. The slippage signal causes draining of the pressure medium, resulting in relief of the pressure channel loading device.

BRIEF DESCRIPTION OF THE DRAWINGS

The features and objects of the present invention will become more apparent, and the invention itself will be best understood from the following detailed description of the preferred embodiment when read with reference to the accompanying drawings, wherein:

Single FIGURE shows a schematic diagram of a control device according to the present invention for a channel bale press.

DETAILED DESCRIPTION OF THE PREFERRED EMBODIMENT

A channel bale press with which a control device according to the present invention is used and which is schematically shown in the drawing, includes essentially a delivery channel 2 with conveyor means 3 that delivers a harvest product from beneath into a pressing channel 4 having a rectangular cross-section. The harvest product is compressed in the pressing channel 4 with a reciprocating plunger 7, which is reciprocated by a crank drive 6 driven by a main drive 5, whereby pressed packages 8 are formed which subsequently are bound by a conventional binding machine into separate bales. The pressing channel 4 has a fixed inlet cross-section defined by two side walls, a top wall 9, and a bottom wall 10. The pressing channel 4 extends toward an open outlet, with the section 11 of the pressing channel 4 adjacent to the outlet having a variable cross-section. The pressing channel section 11 has a stationary bottom while the top wall 9 and two side walls have pivotal rail section 12 which provide for tapering of the section 11 toward the outlet. The pivotal movement of the respective rail sections is effected with respective hydraulic cylinders 14 spaced, respectively, from respective pivot points 13.

The hydraulic cylinder 14 is connected with an electromagnetically actutable three-position directional control valve 16 by a pressure conduit 15. The directional control valve 16 has a central rotary null position as shown in the drawing. A hydraulic pump 17 circulates a pressure medium through the directional control valve 16. The pump 17 delivers an unpressurized pressure medium from a reservoir 18 through a delivery conduit 19 to the directional control valve 16 and back through a return conduit 20 to the reservoir 18. The delivery conduit 19 and the return valve 20 are connected with each other by a pressure limiting valve 21. Upon actuation of the left electromagnet 22, the valve spool moves to the right, and the pump 17 delivers the pressure medium through the valve 16 into the pressure conduit 15. Upon actuation of the right electromagnet 23, the valve spool moves to the left, resulting in flow of the pressure medium from the pressure conduit 20 back into the reservoir 20. The maximum pressure in the pressure conduit 15 is controlled by the pressure limiting valve 21. The directional control valve 16 forms part of an electronic control device generally designated with a reference numeral 24.

The control device 24 includes a comparison circuit 25 which is connected with an electronic operator unit 26, on one hand, and on the other hand, with a pressure sensor 27 provided in the pressure conduit 15, and a load sensor 28, e.g., a load measuring screw of the firm Bosch which is used for measuring the pressure of the plunger 7. The pressure force and/or the hydraulic pressure are used as control parameters for controlling the force applied to the rail section 12 and, thereby, the counterforce acting on the plunger 7. Instead of using a load sensor 28 for measuring the force applied by the plunger 7, a torque sensor 29, which is shown with dash lines, is used for measuring, e.g., a torque on the input shaft 30 of the main drive 5. As a third controlled variable for controlling the force applied by the plunger 7 to the package 8, slippage of a torque limiting coupling 31 can be used. The slippage can be determined by two sensors 32, 33 connectable with the comparison circuit 25. Two control conductors 34, 35 connect the comparison circuit 25 with the opposite electromagnets 22, 23 of the directional control valve 16 for actuating the valve 16 in an appropriate direction.

The operator unit 26 further includes a display 36, a keyboard 37, at least one computer, and a memory. At least pressure set values for the pressure in the pressure conduit 15 leading to the hydraulic cylinder 14 and plunger force set values are predetermined. The operator unit 26 further includes a proportioning element 38 for adjusting the controlled variables, such as constant pressure or constant load, and the proportion ratio of the control parameter. It also displays the actual value. In addition, switches off the control parameters or adjustment of the proportion ratio in accordance with different parameters can be effected automatically or manually. There is further provided an appropriate software, e.g., for switching from constant load control to constant pressure control when the load sensor 28 indicates a sudden reduction of the pressure force, e.g., at the inlet where there is no pressurable product and, thus, no pressurable product is being delivered. If moisture content in the pressurable product is sensed with a moisture content measuring sensor, this controlled variable can be used as a set default value for controlling the pressure in the pressure conduit 15 leading to the hydraulic cylinder 14. The control device operates as follows.

First, an operator, using the key 39, sets a numerical set pressure value, e.g., 30 units for silage or 90 units for straw products, in the parameter range 0 . . . 100 units. The proportioning element 38 (having a parameter range 0 . . . 10) is set at a null, i.e., no proportional regulation takes place, only pure constant pressure regulation is effected. With this setting, the comparison circuit 25 compares the actual value measured by the pressure sensor 27 with the set value. The control device 24 controls the pressure in the pressure conduit 15 by controlling the operation of the directional control valve 16 based on the difference between the set and actual values. Thereby, with a continuous delivery of a uniform swath, pressured packages 8 having substantially the same compression density are produced. The packages 8 move in the pressure direction 40 with each stroke of the plunger 7 by from about 50 mm to about 80 mm upon delivery of a harvest product into the pressure channel 4. The slip signal, which are generated by the sensors 32, 33 and the signal generated by the load sensor 28 do not affect the operation of the bale press during this time. However, the operator unit 26 can display an oscillating set value of the plunger force. With this type of control, the pressure force is noticeably increased upon delivery of a swatch heap, while the pressure is maintained constant to a most possible extent. This is achieved by the control device 24 displacing the spool of the value 16 leftward when the reduction of the pressure is desired, and rightward when the increase in pressure is desired, until a respective disturbance is adjusted. The actually displayed pressure force, acting at an optional pressing power, is taken over as a load set value by a key 41.

When the proportioning element 38 has a setting 10, a pure constant load control takes place, with the comparison circuit only comparing the load value sensed by the load sensor 28 with the set force value. The control device 24 so controls the pressure in the conduit 15 of the hydraulic cylinder 14 that when the pressure force is oscillated as a result of delivery of a material with high moisture content or in heaps, the spool of the directional control valve 16 is displaced so that the pressure force remains constant to a most possible extent during substantial variations of the pressure, which is displayed on the operator unit 26. At high operational capacity, the predetermined pressure level is so undercontrolled that always only the set force value is controlled.

With the setting from 1 to 9, both control parameters, constant pressure and a constant load, are used. The greater is the setting, the greater is the influence of the constant load control. The predetermined set force value and set pressure value are not any more fully controlled, but rather intermediate values are adjusted which correspond either one or the other way present value. By selecting an intermediate setting, the advantage of one or the other control parameter can be used, dependent on properties of the material and the output. In order to achieve the highest pressure density of the straws without overloading the bale press, a setting 3 is set on the proportioning element 38, which setting is selected between 5 and 8 for silage, whereby overloading and improper operation (baler twine breach) is prevented by an optimal adaptation of the pressure applied to the rail sections 12. At setting 8, the constant load control insures, in addition, that the pressure level automatically changes with respect to the set pressure value in order to achieve, at the set pressure, the predetermined pressure force values and, thereby, highest pressure densities, without the press overload.

Further functions of the control device 24 consists in automatic switching of the controlled variable "constant force" to the control variable "constant pressure" when the pressure force falls below a predetermined value. This switching is effected in order to prevent increase of pressure on the rail section 12 caused by reduced delivery of a harvest material to the press inlet and an accompanying reduction of the pressure force. The increased pressure can lead to an overload of the press upon a renewed delivery of the material. To prevent overloading, a maximal pressure force value at which the stability of the press is not affected can be stored so that when this value is exceeded, the operation of the directional control valve is controlled, independent from other parameters, so that the pressure is reduced to a minimal value, or the pressure limiting valve 21 is actuated. Alternatively, the slippage signal generated by the torque sensors 32, 33 can be compared with a maximal set value, with the comparison signal being used for reduction of pressure on the rail sections 12.

Though the present invention was shown and described with references to the preferred embodiment, various modifications thereof will be apparent to those skilled in the art and, therefore, it is not intended that the invention be limited to the disclosed embodiment or details thereof, and departure can be made therefrom within the spirit and scope of the appended claims.

What is claimed is:

1. A bale press for agricultural harvest crops, comprising a pressuring channel having at least a portion of one side thereof formed by a pivotal rail section; hydraulic means for applying pressure to the rail section; a plunger displaceable in the pressure channel for compressing a harvest crop therein; and a control device for controlling operation of the bale press, the control device including a load sensor for sensing loading of the plunger, with the loading representing a first controlled variable, a pressure sensor for sensing pressure in the hydraulic means with the pressure representing a second controlled variable, and means for changing the pressure applied to the rail section upon deviation of at least one of the first and second controlled variables from a respective set value.

2. A bale press as set forth in claim 1, wherein the control device comprises a proportioning element for presetting a proportion ratio of control deviations of set load value and set pressure value for tuning one of the set load value and the set pressure value up to a respective command variable to insure operation of the bale press under one of a constant load control and a constant pressure control.

3. A bale press as set forth in claim 2, wherein the control device further comprises an operator unit including means for presetting set values of the controlled variables, a control system for effecting at least one of the constant load control and the constant pressure control, and means for displaying sensed actual values and set values, the proportioning element being incorporated into the operator unit.

4. A bale press as set forth in claim 3, wherein the set values, the control system and the proportioning element are automatically adjusted dependent on crop parameters, and swath density.

5. A bale press as set forth in claim 1, further comprising means for sensing slippage of a torque limiting clutch, with the slippage representing a third controlled variable.

6. A method of controlling operation of a bale press for agricultural harvest crop including a pressuring channel having at least a portion of one side thereof formed by a pivotal rail section; hydraulic means for applying pressure to the rail section; a plunger displaceable in the pressure channel for compressing a harvest crop therein; and a control device for controlling operation of the bale press, the method comprising the steps of:

sensing loading of the plunger and inputting a loading signal into the control device as a first controlled variable;

sensing pressure in the hydraulic means, which apply pressure to the rail section, and inputting a pressure signal into the control device as a second controlled variable; and changing the pressure applied to the rail section upon deviation of at least one of the first and second controlled variables from a respective set value.

7. A method as set forth in claim 6, comprising the step of using proportional regulation for changing the pressure applied to the rail section at which influence of one of the controlled variables is one of smaller, equal or greater than influence of another of the control variables, whereby the predetermined set value of the one of the controlled variables is automatically adjusted through the another of the controlled variables in accordance with a proportion ratio.

8. A method as set forth in claim 7, comprising the step of presetting in the controlled device the pressure force set value, the pressure set value, the proportion ratio, with changing of the pressure force set value and the pressure value being preset automatically by a computer, so the pressure value can deviate from the set pressure value during press operation.

9. A method as set forth in claim 7, further comprising the step of automatically switching from one of the proportional regulation and a constant pressure force regulation to a constant pressure regulation upon stoppage of crop delivery.

10. A method as set forth in claim 6, further comprising the steps of providing a torque limiting coupling in a drive line of one of main power consumers of the bale press, sensing slippage between input and output shafts of the one of the main consumers, and using the slippage signal as a hierarchically highest controlled variable for preventing bale press overloading by relieving the pressure applied to the rail section by draining a pressure medium.

* * * * *